United States Patent

Kitaori et al.

Patent Number: 5,798,176
Date of Patent: Aug. 25, 1998

[54] MAGNETIC RECORDING MEDIUM

[75] Inventors: Noriyuki Kitaori; Osamu Yoshida; Hirohide Mizunoya; Akira Shiga. all of Tochigi-ken. Japan

[73] Assignee: Kao Corporation, Tokyo. Japan

[21] Appl. No.: 304,227

[22] Filed: Sep. 12, 1994

[30] Foreign Application Priority Data

| Sep. 13, 1993 | [JP] | Japan | 5-227154 |
| Sep. 13, 1993 | [JP] | Japan | 5-227155 |
| Sep. 13, 1993 | [JP] | Japan | 5-227156 |
| Sep. 13, 1993 | [JP] | Japan | 5-227157 |
| Sep. 29, 1993 | [JP] | Japan | 5-243202 |

[51] Int. Cl.$^6$ .................................. G11B 5/66

[52] U.S. Cl. ............ 428/402; 428/694 B; 428/694 BA; 428/394 BH; 428/394 BM; 428/900; 148/300; 148/306

[58] Field of Search ............ 428/694 B. 394 BA. 428/394 BH, 900, 694 BM, 402; 148/300, 306

[56] References Cited

U.S. PATENT DOCUMENTS

| 5,114,801 | 5/1992 | Aoki et al. | 428/694 BH |
| 5,160,761 | 11/1992 | Koga et al. | 427/548 |
| 5,180,608 | 1/1993 | Chiba et al. | 427/560 |
| 5,238,507 | 8/1993 | Kugimiya | 148/307 |
| 5,384,182 | 1/1995 | Ito et al. | 428/212 |
| 5,427,869 | 6/1995 | Sugita et al. | 428/684 T |
| 5,470,645 | 11/1995 | Oguchi et al. | 428/212 |
| 5,494,732 | 2/1996 | Ito et al. | 428/212 |
| 5,496,653 | 3/1996 | Saito et al. | 428/694 B |
| 5,536,585 | 7/1996 | Futamoto et al. | 428/611 |
| 5,648,155 | 7/1997 | Tokui | 428/323 |

Primary Examiner—Leszek Kiliman
Attorney, Agent, or Firm—Oblon. Spivak. McClelland. Maier & Neustadt, P.C.

[57] ABSTRACT

The present invention is a magnetic recording medium comprising a substrate and a magnetic layer including a binder resin and a plate-like magnetic powder of which easy axis of magnetization exists in a plane, and this magnetic recording medium is excellent in recording and regeneration characteristics.

29 Claims, 1 Drawing Sheet

MAGNETIC RECORDING MEDIUM

BACKGROUND OF THE PRESENT INVENTION

The present invention relates to a magnetic recording medium.

A magnetic recording medium that is made in a way of coating a magnetic paint made by dispersing magnetic powder and binder resin into an organic solvent on a substrate and drying it, is known.

As the magnetic powder used for such a magnetic recording medium, needle-like magnetic powder made of oxides such as $Fe_2O_3$ and the like, a plate-like magnetic powder such as barium ferrite or needle-like metallic magnetic powder are known. For a high-density recording, the needle-like metallic magnetic powder is used. The reason is that the needle-like magnetic powder has high coercive force Hc and large saturation magnetization σs, so that its residual magnetic flux density Br and magnetic energy determined by Hc×Br are high.

To realize high-density recording, it is necessary to make magnetic powder's particle diameter small. Because, the S/N (signal/noise) is proportional to $(1/Vp)^{1/2}$ (where, Vp is volume of the particle). Therefore, to obtain a recording medium of high S/N, it is necessary to make the magnetic powder small. Here, it is known that the magnetic powder of which particle diameter is 0.2 μm or less, especially 0.12 μm or less is preferable to perform high density recording, for example, to record a signal of which recording wave length is 0.7 μm or less.

By the way, when the particle diameter of metallic magnetic powder becomes 0.12 μm or less, saturation magnetization σs thereof becomes 110 emu/g or less. By this, it becomes difficult to correspond to high-density recording. In addition, there is a problem that the particle diameter of magnetic powder becomes fine, degree of orientation thereof can not go up.

SUMMARY OF THE INVENTION

It is an object of the present invention to provide a high-performance magnetic recording medium.

The object of the present invention is achieved by a magnetic recording medium comprising a substrate and a magnetic layer including plate-like metallic magnetic powder of which easy axis of magnetization exists in a plate-like plane of the particles of said powder, on said substrate.

Moreover, in the magnetic layer of the magnetic recording medium of the present invention, a binder resin and plate-like metallic magnetic powder of which easy axis of magnetization exists in a plate-like plane are included. That is, the object of the present invention is achieved by a magnetic recording medium comprising a magnetic layer on a substrate, wherein said substrate is a non-magnetic substrate, plate-like metallic magnetic powder of which easy axis of magnetization exists in a plate-like plane and a binder resin are included in said magnetic layer, and the ratio of said magnetic powder and binder resin is 100:5 to 100:100 in weight.

It is to be noted that it is preferable that the magnetic powder used for the magnetic recording medium of the present invention is metallic magnetic powder of which thickness is in the range from 0.001 to 0.1 μm, diameter is in the range from 0.03 to 0.5 μm and diameter/thickness (plate ratio) is in the range from 3 to 20. In addition, the magnetic powder of which thickness is in the range from 0.005 to 0.05 μm, diameter is in the range from 0.05 to 0.15 μm and plate ratio is in the range from 8 to 16 is more preferable.

Moreover, the metallic magnetic powder of which coercive force is in the range from 800 to 1900 Oe, saturation magnetization is in the range from 110 to 160 emu/g is preferable. In addition the metallic magnetic powder of which coercive force is in the range from 1000 to 1700 Oe, saturation magnetization σs is 120 emu/g or more is more preferable.

As an example of the metallic magnetic powder, a metallic magnetic powder of which principal component is hexagonal plate-like iron can be used. Such magnetic powder can be obtained by baking and reducing hexagonal plate-like δ-FeOOH as a seed. Especially, it can be obtained by baking and reducing hexagonal plate-like δ-FeOOH with a sintering preventive agent on its surface. It is to be noted that for such a sintering preventive agent an oxide ($SiO_2$, $Al_2O_3$, for example) of an element selected from a group of Si, Al, Cr, Ru, Ca, Zr, P, Mo, Ti, Mn can be used as a concrete example.

Moreover, a metallic magnetic powder obtained by reducing hexagonal plate-like ferrite magnetic powder can be used other than above-mentioned metallic magnetic powders. Especially, a metallic magnetic powder obtained by reducing hexagonal plate-like ferrite magnetic powder with a sintering preventive agent on its surface can be used. It is to be noted that the hexagonal plate-like ferrite magnetic powder is expressed as $BaO \cdot 6Fe_2O_3$, where a part of Ba and Fe can be displaced by other metals (Ti, Cr, Co, Zn, In, Mn, Cu, Ge, Nb, etc., for example). For the sintering preventive agent, the above-mentioned can be used.

It is to be noted that the metallic magnetic powder of which thickness is in the range from about 0.003 to 0.1 μm, diameter is in the range from about 0.03 to 0.5 μm and the plate ratio is in the range from 3 to 20 is preferable. Additionally, the magnetic powder of which coercive force thereof is in the range from about 800 to 1900 Oe, saturation magnetization σs is in the range from about 110 to 160 emu/g is preferable.

In this magnetic powder, its dimension is larger than that of needle-like magnetic powder of the same length as the magnetic powder due to its flatness, so that high saturation magnetization σs can be expected in this case. Additionally, high packing density due to the flatness and high S/N due to large number of effective magnetic powder per a unit volume can be expected. As a result, a high-performance magnetic recording medium excellent in regeneration characteristics can be obtained. In addition, contrary to a ferrite magnetic powder of hexagonal system of which easy axis of magnetization is vertical to the plate-like plane, the magnetic powder of the present invention is excellent in recording and regeneration characteristics using a ring magnetic head, because the easy axis of magnetization thereof is in the plate-like plane of the magnetic powder.

By the following process, a plate-like metallic magnetic powder of which easy axis of magnetization is in the plate-like plane can be obtained.

For example, by the following process, a metallic magnetic powder of which principal component is hexagonal plate-like iron can be obtained.

As being added by caustic soda of more than equivalent weight under stirred, an aqueous solution of ferrous sulfate (a part of Fe can be displaced by Co, Ni, Zn, Sn, etc.) is turned to alkaline. By this iron hydroxide is precipitated. After this, the solution is added by aqueous solution of hydrogen peroxide under stirring, to be oxidized by force.

Next, the solution is added by water-glass and aluminum chloride, pH value thereof is adjusted to 6 or less using acetic acid, followed by filtered. The residue by filtering is washed by water and baked in air at 650° C. After baked, the residue is reduced by hydrogen gas at 420° C. and the metallic magnetic powder of which principal component is hexagonal plate-like iron is obtained.

The magnetic powder of the present invention also can be obtained by reducing hexagonal plate-like ferrite magnetic powder.

The process is as below.

First, barium ferrite magnetic powder (ferrite magnetic powder of hexagonal system) is obtained by solid phase reaction, coprecipitation-thermal reaction, hydrothermal synthesis method, oxide flux method, fused salt method or glass crystallization method. Especially, a glass forming substance presented by $B_2O_3$ is mixed by barium ferrite component, the mixture is dissolved at 1300° C. or more, cooled rapidly and glass (amorphous solid) is obtained. Then, the glass is crystallized after heated to 700° C. or more. Then, residual glass substances and acid are dissolved using hot water, followed by washing and drying. This is glass crystallization method and the powder obtained by this method is preferable. Also the powder obtained by autoclave method that is a way of heating α-FeOOH or $Fe(OH)_3$, NaOH, $Ba(OH)_2$ and so on in an autoclave at 200° to 300° C. for 5 to 10 hours is preferable.

Next, the hexagonal plate-like metallic magnetic powder is obtained by heating and reducing by hydrogen gas the above-mentioned ferrite magnetic powder of hexagonal system, especially ferrite magnetic powder of hexagonal system with oxide ($SiO_2$ or $Al_2O_3$, for example) of at least one element selected from a group of Si, Al, Cr, Ru, Ca, Zr, P, Mo, Mn and Ti on the surface thereof as a sintering agent.

Furthermore, the object of the present invention is achieved by a magnetic recording medium comprising a substrate and a magnetic layer including plate-like oxide magnetic powder of which easy axis of magnetization exists in a plate-like plane on said substrate.

It is to be noted that the magnetic layer of the magnetic recording medium of the present invention includes a binder resin and plate-like oxide magnetic powder of which easy axis of magnetization exists in a plate-like plane. Accordingly, the object of the present invention is achieved by a magnetic recording medium comprising a magnetic layer on a substrate, wherein said substrate is a non-magnetic substrate, said magnetic layer includes plate-like oxide magnetic powder of which easy axis of magnetization exists in a plate-like plane and binder resin, the ratio of said magnetic powder and binder resin is 100:5 to 100:100 (in weight ratio).

It is to be noted that it is preferable that the magnetic powder used for the magnetic recording medium of the present invention is an oxide magnetic powder of which thickness is in the range from 0.001 to 0.1 μm, diameter is in the range from 0.03 to 0.5 μm and plate ratio is in the range from 3 to 20. In addition, the oxide magnetic powder of which thickness is in the range from 0.005 to 0.05 μm, diameter is in the range from 0.05 to 0.1 μm and plate ratio is in the range from 10 to 20 is more preferable.

Moreover, the oxide magnetic powder of which coercive force is in the range from 300 to 550 Oe, saturation magnetization is in the range from 70 to 90 emu/g is preferable. In addition the oxide magnetic powder of which coercive force is in the range from 400 to 550 Oe, saturation magnetization σs is 72 emu/g or more is more preferable.

As a concrete example of the oxide magnetic powder, an oxide magnetic powder of which principal component is hexagonal plate-like $FeO_x$ ($1.3 \leq x \leq 1.5$) can be used. Such magnetic powder can be obtained by baking, reducing and oxidizing hexagonal plate-like δ-FeOOH as a seed. Especially, it can be obtained by baking, reducing and oxidizing hexagonal plate-like δ-FeOOH with a sintering preventive agent on its surface. It is to be noted that for such a sintering preventive agent an oxide ($SiO_2$, $Al_2O_3$, for example) of an element selected from a group of Si, Al, Cr, Ru, Ca, Zr, P, Mo, Ti, Mn can be listed up as a concrete example.

In this magnetic powder, its dimension is larger than that of needle-like magnetic powder of the same length as the magnetic powder due to its flatness, so that high saturation magnetization σs can be expected in this case. Additionally, high packing density due to the flatness and high S/N due to large number of effective magnetic powder per a unit volume can be expected. As a result, a high-performance magnetic recording medium excellent in regeneration characteristics can be obtained. In addition, contrary to a ferrite magnetic powder of hexagonal system of which easy axis of magnetization is vertical to the plate-like plane, the magnetic powder by the present invention is excellent in recording and regeneration characteristics using a ring magnetic head, because the easy axis of magnetization thereof is in the plate-like plane.

By the following process, a plate-like oxide magnetic powder of which easy axis of magnetization is in the plate-like plane can be obtained.

For, example, by the following process, an oxide magnetic powder made of hexagonal plate-like $FeO_x$ ($1.3 \leq x \leq 1.5$) can be obtained.

As being added by caustic soda of more than equivalent weight under stirred, an aqueous solution of ferrous sulfate (a part of Fe can be displaced by Co, Ni, Zn, Sn, etc.) is turned to alkaline. By this iron hydroxide is precipitated. After this, the solution is added by aqueous solution of hydrogen peroxide under stirring, to be oxidized by force. Next, the solution is added by water-glass and aluminum chloride, pH value thereof is adjusted to 6 or less using acetic acid, followed by filtered. The residue by filtering is washed by water and baked in air at 650° C. After baked, the residue is reduced by hydrogen gas at 420° C. and re-oxidized in air at about 70° to 300° C., thus the oxide magnetic powder is obtained.

Furthermore, the object of the present invention is achieved by a magnetic recording medium comprising a substrate and a magnetic layer including plate-like oxide magnetic powder containing Co of which easy axis of magnetization exists in a plate-like plane on said substrate.

It is to be noted that the magnetic layer of the magnetic recording medium of the present invention includes a binder resin and plate-like oxide magnetic powder containing Co of which easy axis of magnetization exists in a plate-like plane. Accordingly, the object of the present invention is achieved by a magnetic recording medium comprising a magnetic layer on a substrate, wherein said substrate is a non-magnetic substrate, said magnetic layer includes plate-like oxide magnetic powder containing Co of which easy axis of magnetization exists in a plate-like plane and binder resin, the ratio of said magnetic powder and the binder resin is 100:5 to 100:100 (in weight ratio).

It is to be noted that it is preferable that the magnetic powder used for the magnetic recording medium of the present invention is oxide magnetic powder containing Co of which thickness is in the range from 0.001 to 0.1 μm, diameter is in the range from 0.03 to 0.5 μm and plate ratio is in the range from 3 to 20. In addition, the oxide magnetic powder containing Co of which thickness is in the range from 0.005 to 0.05 μm, diameter is in the range from 0.05 to 0.1 μm and plate ratio is in the range from 10 to 20 is more preferable.

Moreover, the oxide magnetic powder containing Co of which coercive force is in the range from 500 to 1000 Oe, saturation magnetization σs is in the range from 70 to 85 emu/g is preferable. In addition the oxide magnetic powder containing Co of which coercive force is in the range from 700 to 900 Oe, saturation magnetization σs is 72 emu/g or more is more preferable.

As a concrete example of the magnetic powder, an oxide magnetic powder of which principal component is hexagonal plate-like $FeO_x$ ($1.3 \leq x \leq 1.5$) containing Co (adherent type or doping type) can be used. Such magnetic powder can be obtained by baking Co or Co salt and hexagonal plate-like δ-FeOOH as seeds. Especially, it can be obtained by baking, reducing and oxidizing Co or Co salt and hexagonal plate-like δ-FeOOH with a sintering preventive agent on its plane as seeds.

It is preferable that Co content of hexagonal plate-like oxide magnetic powder containing Co used by the present invention such as the hexagonal plate-like $FeO_x$ containing Co is in the range from 0.5 to 10%.

In this magnetic powder, its dimension is larger than that of needle-like magnetic powder of the same length as the magnetic powder due to its flatness, so that high saturation magnetization σs can be expected in this case. Additionally, high packing density due to the flatness and high S/N due to large number of effective magnetic powder per a unit volume can be expected. As a result, a high-performance magnetic recording medium excellent in regeneration characteristics can be obtained. In addition, contrary to a ferrite magnetic powder of hexagonal system of which easy axis of magnetization is vertical to the plate-like plane, the magnetic powder by the present invention is excellent in recording and regeneration characteristics using a ring magnetic head, because the easy axis of magnetization thereof is in the plate-like plane. Moreover, the following fact was reported that when using a magnetic recording medium having suitable abrasion (head abrasion of 1 to 2 μm after 100 hours running) with a ferrite head, sliding noise is small. On this report, as the magnetic powder of the present invention is plate-like it is preferable.

By the following process, an oxide magnetic powder containing Co of which easy axis of magnetization exists in a plate-like plane such as an oxide magnetic powder made of hexagonal plate-like $FeO_x$ ($1.3 \leq x \leq 1.5$) containing Co can be obtained.

As being added by caustic soda of more than equivalent weight under stirred, an aqueous solution of ferrous sulfate (a part of Fe can be displaced by Co, Ni, Zn, Sn, etc.) is turned to alkaline. By this iron hydroxide is precipitated. After this, the solution is added by aqueous solution of hydrogen peroxide under being stirred, to be oxidized by force. By this, hexagonal plate-like δ-FeOOH is obtained. Next, the solution is added by cobalt nitrate (it is possible to use cobalt ferrite or other Co salt. Also metallic Co is possible. Or, Mn or salt thereof, Cr or salt thereof, Ni or salt thereof, Zn or salt thereof, Sn or salt thereof can be added). Next, the solution is added by water-glass and aluminum chloride, pH value thereof is adjusted to 6 or less using acetic acid, followed by filtered. The residue by filtering is washed by water and baked in air at 650° C. After baked, the residue is reduced by hydrogen gas at 480° C. and re-oxidized in air at about 70° to 300° C., thus the oxide magnetic powder is obtained.

In the present invention, the above-mentioned magnetic powders are mainly used. However, it is possible to be used in combination with following ferromagnetic metallic powders such as Co, Ni, Fe—Co, Fe—Ni, Fe—Al, Fe—Ni—Al, Co—Ni, Fe—Co—Ni, Fe—Ni—Al—Zn, Fe—Al—Si, etc.

In the above description, only the case of forming single magnetic layer was explained. The present invention, however, can be applied to the types having multiple magnetic layers. For these types, it is preferable to provide the second magnetic layer comprising needle-like magnetic powder under the first magnetic layer containing metallic magnetic powder of which easy axis of magnetization exists in a plate-like plane. Especially, it is preferable that the coercive force of the metallic magnetic powder in the first magnetic layer is larger than that of the needle-like magnetic powder in the second magnetic layer. It is preferable that the coercive force of the needle-like magnetic powder is in the range from about 50 to 1500 Oe, for example. It is to be noted that an oxide magnetic powder such as iron oxide containing Co or a metal of which principal component is Fe is possible to use for the needle-like magnetic powder. Additionally, it is preferable that the average length of major axis of such a needle-like magnetic powder is in the range from 0.1 to 1 μm and the average length of minor axis is in the range from 0.01 to 0.1 μm. And the thickness of the first magnetic layer is in the range from 0.1 to 3 μm and the thickness of the second magnetic layer is in the range from 0.5 to 5 μm.

As the binder for forming magnetic layers (the first magnetic layer or the second magnetic layer) of the magnetic recording medium, thermoplastic resin, thermosetting resin or reactive resin can be used, or mixtures thereof can be used in combination. For example, as the thermosetting resin, the following are listed up: polyvinyl chloride, vinyl chloride-vinyl acetate copolymer, vinyl chloride-vinylidene chloride copolymer, vinyl chloride-acrylonitrile copolymer, acrylic ester-acrylonitrile copolymer, acrylic ester-vinylidene chloride copolymer, urethane elastomer, vinylidene chloride-acrylonitrile copolymer, butadiene-acrylonitrile copolymer, polyamide resin, cellulose derivatives, styrene-butadiene copolymer, polyester resin. As the thermosetting resins and reactive resins, the following are listed up: phenol-formalin-novolak resin, phenol-formalin-resol resin, urea resin, melamine resin, unsaturated polyester resin, terminal isocyanate polyester humiditysetting resin, terminal isocyanate polyether humiditysetting resin, polyisocyanate prepolymer, etc. These binder resins are used in the ratio from about 5 to 100 part by weight, preferably 10 to 30 part by weight per magnetic powder 100 part by weight.

As the other components to be added to the magnetic layers of the magnetic recording medium, dispersant, lubricant, abrasive agent, antistatic agent, anti-corrosion agent, mildewproofing agent or the like can be used.

The recording medium of the present invention is obtained by coating a magnetic paint made by kneading and dispersing the above magnetic powder, binder and some agents into a solvent, orientating it if necessary, and drying it. If necessary, surface smoothing and cutting to desired shape are performed.

EXAMPLE

[Example-1]

Figure 1:
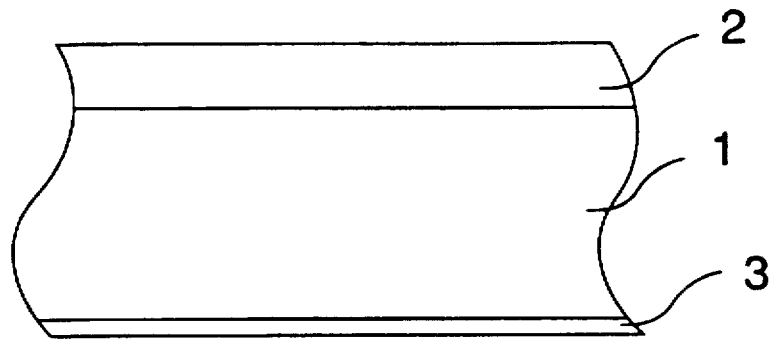
FIG. 1 is a schematic diagram of a magnetic recording medium.

5% aqueous solution of ferrous sulfate was put into a vessel with a stirrer. Under stirring, 10% aqueous solution of caustic soda was added thereinto and the solution was adjusted to pH 10. By this, white iron hydroxide was precipitated. After this, the solution was added by 20 wt % aqueous solution of hydrogen peroxide till the color of solution became brown-black. By this operation, iron hydroxide was oxidized by force and became hexagonal plate-like δ-FeOOH. Next, the solution was filtered using a filter press and washed by water. Then, it is added by pure water to disperse it sufficiently, followed by adding water-glass so as to be 1 wt % to Fe and aluminum chloride so as to be 1 wt % to Fe, pH value thereof was adjusted to 4 by adding acetic acid. Then, it was filtered using a filter press and washed by water. Next, the precipitation was baked for 2 hours in air at 650° C. using a muffle furnace. After being baked, it was reduced by hydrogen gas at 450° C. using a batch kiln. Then, the temperature of the kiln was reduced to room temperature, and air was injected slowly. After 40 hours, inside of the kiln was displaced by air. Then, magnetic powder was taken out from the kiln.

As a result of examining the obtained magnetic powder, it was found that the obtained magnetic powder was hexagonal plate-like and the thickness thereof was 0.0125 μm, the diameter was 0.1 μm and the plate ratio was 8. In addition, the coercive force Hc thereof was 1520 Oe, saturation magnetization σs was 130 emu/g, the easy axis of magnetization was in direction of plane of hexagonal plate-like.

Next, a magnetic paint was prepared using this metallic magnetic powder 246 part by weight, vinyl chloride resin 19 part by weight, polyurethane resin 28 part by weight, polyisocyanate 7 part by weight, alumina of particle diameter 0.15 μm 30 part by weight, fatty ester 8 part by weight, toluene 298 part by weight, methyl ethyl ketone 298 part by weight and cyclohexanone 66 part by weight.

Then, this magnetic paint was coated on polyethylene terephthalate (PET) film 1 of 10 μm thickness by direct gravure method to be 2.9 μm thickness after being dryed, thus the magnetic layer 2 was formed.

After this process, a paint containing carbon black was coated on the opposite plane of the magnetic layer 2 of the PET film 1 to be 0.5 μm thickness after being dryed, thus the backcoat layer 3 was formed.

Next, the film was cut 8 mm width to obtain a magnetic tape for VTR.

[Example-2]

By the same way as Example-1, a hexagonal plate-like metallic magnetic powder (thickness: 0.005 μm, diameter: 0.06 μm, plate ratio: 12, coercive force: 1640 Oe, saturation magnetization: 112 emu/g, easy axis of magnetization exists in direction of plane of the hexagonal plate-like.) was obtained.

Using this magnetic powder, a magnetic tape was obtained in the same way as Example-1.

[Example-3]

By the same way as Example-1, a hexagonal plate-like metallic magnetic powder (thickness: 0.02 μm, diameter: 0.15 μm, plate ratio: 8, coercive force: 1150 Oe, saturation magnetization: 134 emu/g, easy axis of magnetization exists in direction of plane of the hexagonal plate-like.) was obtained.

Using this magnetic powder, a magnetic tape was obtained in the same way as Example-1.

[Example-4]

By the same way as Example-1, a hexagonal plate-like metallic magnetic powder (thickness: 0.03 μm, diameter: 0.2 μm, plate ratio: 7, coercive force: 1020 Oe, saturation magnetization: 135 emu/g, easy axis of magnetization exists in direction of plane of the hexagonal plate-like.) was obtained.

Using this magnetic powder, a magnetic tape was obtained in the same way as Example-1.

[Example-5]

By the same way as Example-1, a hexagonal plate-like metallic magnetic powder (thickness: 0.008 μm, diameter: 0.14 μm, plate ratio: 18, coercive force: 1460 Oe, saturation magnetization: 130 emu/g, easy axis of magnetization exists in direction of plane of the hexagonal plate-like.) was obtained.

Using this magnetic powder, a magnetic tape was obtained in the same way as Example-1.

[Example-6]

Barium ferrite magnetic powder of hexagonal system (prepared by autoclave method, thickness: 0.01 μm, diameter: 0.12 μm, plate ratio: 12, coercive force Hc: 1460 Oe, saturation magnetization σs: 56 emu/g) was reduced by hydrogen gas using a batch kiln at 450° C. Then, the temperature of the kiln was reduced to room temperature, and air was injected slowly. After 40 hours, inside of the kiln was displaced by air. Then, magnetic powder was taken out from the kiln.

As a result of examining the obtained magnetic powder, it was found that it was hexagonal plate-like and the thickness thereof was 0.01 μm, the diameter was 0.09 μm and the plate ratio was 9. In addition, the coercive force Hc thereof was 1600 Oe, saturation magnetization σs was 125 emu/g, the easy axis of magnetization was in direction of plane of hexagonal plate-like.

Using this magnetic powder, a magnetic tape was obtained in the same way as Example-1.

[Example-7]

Barium ferrite magnetic powder of hexagonal system (thickness: 0.01 μm, diameter: 0.12 μm, plate ratio: 12, coercive force Hc: 1390 Oe, saturation magnetization σs: 58 emu/g) with 1 wt % of $SiO_2$ and $Al_2O_3$ on the surface was reduced by hydrogen gas using a batch kiln at 450° C. Then, the temperature of the kiln was reduced to room temperature, and air was injected slowly. After 40 hours, inside of the kiln was displaced by air. Then, magnetic powder was taken out from the kiln.

As a result of examining the obtained magnetic powder, it was found that it was hexagonal plate-like and the thickness thereof was 0.01 μm, the diameter was 0.09 μm and the plate ratio was 9. In addition, the coercive force Hc thereof was 1570 Oe, saturation magnetization σs was 132 emu/g, the easy axis of magnetization was in direction of plane of hexagonal plate-like.

Using this magnetic powder, a magnetic tape was obtained in the same way as Example-1.

[Example-8]

Figure 2:
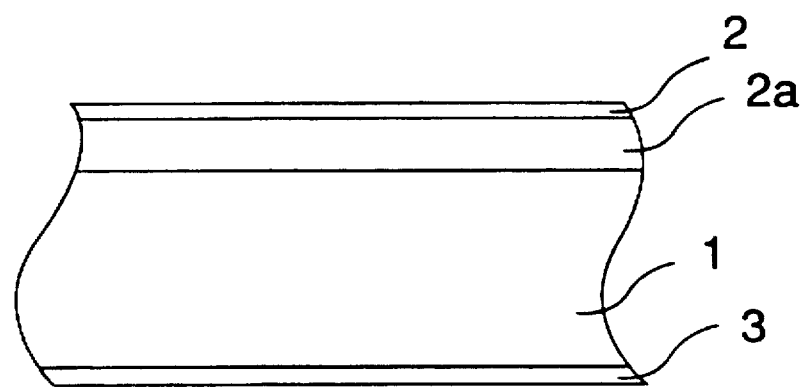
FIG. 2 is a schematic diagram of a magnetic recording medium.

In Example-1, before preparing the magnetic layer 2, the second magnetic paint was coated on the PET film 1 to be 2.0 μm thickness after being dryed as shown in FIG. 2, thus the magnetic layer 2a was formed. After this process, the magnetic layer 2 (thickness: 0.5 μm) same as the magnetic layer 2 in Example-1 was provided and processed in the same way as Example-1.

For the magnetic paint forming the magnetic layer 2a, the following are used, that is, needle-like magnetic powder of $\gamma\text{-Fe}_2\text{O}_3$ containing Co 246 part by weight, vinyl chloride resin 19 part by weight, polyurethane resin 28 part by weight, polyisocyanate 7 part by weight, alumina of particle diameter 0.15 μm 30 part by weight, fatty ester 8 part by weight, toluene 298 part by weight, methyl ethyl ketone 298 part by weight and cyclohexanone 66 part by weight.

It is to be noted that characteristics of the needle-like magnetic powder of $\gamma\text{-Fe}_2\text{O}_3$ containing Co is that coercive force Hc is 680 Oe, saturation magnetization σs is 84 emu/g, specific surface area is 38 m²/g, needle ratio (major axis/minor axis) is 9, average length of major axis is 0.20 μm.

[Example-9]

The same way as Example-8 was done except for using needle-like metallic magnetic powder instead of $\gamma\text{-Fe}_2\text{O}_3$ containing Co.

It is to be noted that characteristics of this needle-like metallic magnetic powder is that coercive force Hc is 800 Oe, saturation magnetization σs is 130 emu/g, specific surface area is 50 m²/g, needle ratio is 6, average length of major axis is 0.3 μm.

[Comparison-1]

The same way as Example-1 was done and a magnetic tape was obtained except for using needle-like metallic magnetic powder (length of major axis: 0.1 μm, needle ratio: 8, coercive force Hc: 1560 Oe, saturation magnetization σs: 110 emu/g) instead of the magnetic powder in Example-1.

[Comparison-2]

The same way as Example-1 was done and a magnetic tape was obtained except for using barium ferrite magnetic powder of hexagonal system (diameter: 0.1 μm, plate ratio: 8, coercive force Hc: 1410 Oe, saturation magnetization σs: 56 emu/g) instead of the magnetic powder in Example-1.

[Comparison-3]

The same way as Example-6 was done and a magnetic tape was obtained except for using barium ferrite magnetic powder of hexagonal system (diameter: 0.12 μm, plate ratio: 12, coercive force Hc: 1460 Oe, saturation magnetization σs: 56 emu/g) instead of the magnetic powder in Example-6.

[Characteristics]

Loading the magnetic tapes obtained in the above-mentioned examples and comparisons and using 8 mm VTR on the market with a ring type magnetic head and a noise meter, Y-S/N, C-S/N, steel durability and anti-corrosion performance were examined. The results are shown in Table-1.

It is to be noted that anti-corrosion performance is expressed by reduction ratio of saturation magnetic flux density of the tape after being left for a week under the condition of 60° C. and 90% RH. Where, Y-S/N and C-S/N are shown in dB unit by relative value to a tape on the market as a reference tape.

TABLE 1

| | Hc (emu/g) | Bs (G) | Y-S/N (dB) | C-S/N AM | C-S/N PM | Steel durability (dB) | Anti-corrosion (%) |
|---|---|---|---|---|---|---|---|
| E-1 | 1650 | 3500 | +1.8 | +1.9 | +2.4 | −0.4 | 4 |
| E-2 | 1710 | 2900 | +3.1 | +1.1 | +1.2 | −0.4 | 6 |
| E-3 | 1280 | 3600 | +0.9 | +2.0 | +1.8 | −0.3 | 2 |
| E-4 | 1190 | 3650 | +0.8 | +1.6 | +1.7 | −0.2 | 2 |
| E-5 | 1600 | 3500 | +1.7 | +2.1 | +2.6 | −0.3 | 3 |
| E-6 | 1600 | 3300 | +1.0 | +1.5 | +1.3 | −0.4 | 4 |
| E-7 | 1630 | 3100 | +1.3 | +1.2 | +1.1 | −0.2 | 2 |
| E-8 | — | — | +4.8 | +0.5 | +0.4 | −0.3 | 4 |
| E-9 | — | — | +5.4 | +1.5 | +1.2 | −0.4 | 6 |
| C-1 | 1600 | 2700 | +0.8 | −0.1 | −0.3 | −0.9 | 9 |
| C-2 | 1580 | 1800 | +0.4 | −3.4 | −4.5 | −0.6 | 1 |
| C-3 | 1580 | 1900 | +0.4 | −3.6 | −5.1 | −0.5 | 1 |

Where, E expresses Example and C expresses Comparison.

According to this table, it is found that the recording medium of the present invention formed by a plate-like metallic magnetic powder of which easy axis of magnetization exists in a plate-like plane (a metallic magnetic powder of which principal component is hexagonal plate-like iron) is excellent in recording and regeneration characteristics, steel durability and anti-corrosion.

[Example-10]

5% aqueous solution of ferrous sulfate was put into a vessel with a stirrer. Under stirring, 10% aqueous solution of caustic soda was added thereinto and the solution was adjusted to pH 10. By this, white iron hydroxide was precipitated. After this, the solution was added by 20 wt % aqueous solution of hydrogen peroxide till the color of solution became brown-black. By this operation, iron hydroxide was oxidized by force and became hexagonal plate-like δ-FeOOH. Next, the solution was filtered using a filter press and washed by water. Then, it is added by pure water to disperse it sufficiently, followed by adding water-glass so as to be 1 wt % to Fe and aluminum chloride so as to be 1 wt % to Fe, pH value thereof was adjusted to 4 by adding acetic acid. Then, it was filtered using a filter press and washed by water. Next, the precipitation was baked for 2 hours in air at temperature of 650° C. using a muffle furnace. After being baked, it was reduced by mixture gas of hydrogen gas and nitrogen gas at 380° C. using a batch kiln. After this reduction, it was held 300° C. in air to be re-oxidized.

As a result of examining the obtained magnetic powder, it was found that the obtained magnetic powder was hexagonal plate-like $\gamma\text{-Fe}_2\text{O}_3$ and the thickness thereof was 0.04 μm, the diameter was 0.3 μm and the plate ratio was 7.5. In addition, the coercive force Hc thereof was 340 Oe, saturation magnetization σs was 72 emu/g, the easy axis of magnetization was in direction of plane of hexagonal plate-like.

Next, a magnetic paint was prepared using this oxide magnetic powder 246 part by weight, vinyl chloride resin 19 part by weight, polyurethane resin 28 part by weight, polyisocyanate 7 part by weight, alumina of particle diameter 0.15 μm 30 part by weight, fatty ester 8 part by weight, toluene 298 part by weight, methyl ethyl ketone 298 part by weight and cyclohexanone 66 part by weight.

Then, this magnetic paint was coated on a PET film of 10 μm thickness by direct gravure method to be 5.0 μm thickness after being dryed, thus a magnetic layer was formed.

After this process, the film was cut 3.8 mm width to obtain an audio magnetic tape.

[Example-11]

By the same way as Example-10 except for the temperature 250° C. at re-oxidizing, a hexagonal plate-like magnetic powder of γ-FeO$_x$ (x=1.41, thickness: 0.03 μm, diameter: 0.25 μm, plate ratio: 8, coercive force Hc: 360 Oe, saturation magnetization σs: 80 emu/g) was obtained.

Using this magnetic powder, an audio magnetic tape was obtained in the same way as Example-10.

[Example-12]

By the same way as Example-10 except for the temperature 80° C. at re-oxidizing, a hexagonal plate-like magnetic powder of γ-Fe$_3$O$_4$ (thickness: 0.02 μm, diameter: 0.2 μm, plate ratio: 10, coercive force Hc: 420 Oe, saturation magnetization σs: 86 emu/g) was obtained.

Using this magnetic powder, an audio magnetic tape was obtained in the same way as Example-10.

[Comparison-4]

By the same way as Example-10 except for using γ-Fe$_2$O$_3$ (length of major axis: 0.3 μm, needle ratio: 10, coercive force Hc: 320 Oe, saturation magnetization σs: 71 emu/g) instead of the magnetic powder used in Example-10, a magnetic tape was obtained.

[Comparison-5]

By the same way as Example-10 except for using a hexagonal plate-like barium ferrite magnetic powder (diameter: 0.3 μm, plate ratio: 5, coercive force Hc: 680 Oe, saturation magnetization σs: 50 emu/g) instead of the magnetic powder used in Example-10, a magnetic tape was obtained.

[Characteristics]

Magnetic characteristics and electromagnetic conversion characteristics of magnetic tapes obtained in the above examples and comparisons were examined. The results are shown in the following Table-2. Where, the electromagnetic conversion characteristics is referenced by the tape obtained in Comparison 4.

TABLE 2

| | Hc | Bs | MOL(dB) | | Sensitivity(dB) | | |
|---|---|---|---|---|---|---|---|
| | emu/g | G | 333 Hz | 10 kHz | 333 Hz | 3 kHz | 10 kHz |
| E-10 | 370 | 2000 | +1.5 | 0 | +0.5 | +0.6 | +1.1 |
| E-11 | 380 | 2100 | +2.4 | 0 | +1.3 | +1.4 | +2.1 |
| E-12 | 430 | 2400 | +4.0 | +0.5 | +1.4 | +2.0 | +2.8 |
| C-4 | 370 | 1900 | 0 | 0 | 0 | 0 | 0 |
| C-5 | 740 | 1700 | −4.5 | −2.7 | −6.5 | −5.4 | −5.3 |

Where, MOL=Maximum Output Level, E expresses Example and C expresses Comparison.

By this examination, it is found that the magnetic recording medium by the present invention made of a plate-like oxide magnetic powder of which easy axis of magnetization exists in a plate-like plane is excellent in electromagnetic conversion characteristics.

[Example-13]

5% aqueous solution of ferrous sulfate was put into a vessel with a stirrer. Under stirring, 10% aqueous solution of caustic soda was added thereinto and the solution was adjusted to pH 10. By this, white iron hydroxide was precipitated. After this, the solution was added by 20 wt % aqueous solution of hydrogen peroxide till the color of solution became brown-black. By this operation, iron hydroxide was oxidized by force and became hexagonal plate-like δ-FeOOH. Next, the solution was filtered using a filter press and washed by water. Then, it is added by pure water to disperse it sufficiently, followed by adding cobalt nitrate so as to be 5 wt % to Fe, water-glass so as to be 1 wt % to Fe and aluminum chloride so as to be 1 wt % to Fe, pH value thereof is adjusted to 4 by adding acetic acid. Then, it was filtered using a filter press and washed by water. Next, the precipitation was baked for 2 hours in air at 650° C. using a muffle furnace. After being baked, it was reduced by hydrogen gas at 380° C. using a batch kiln. After this reduction, it was held 250° C. in air to be re-oxidized.

As a result of examining the obtained magnetic powder, it was found that the obtained magnetic powder was hexagonal plate-like γ-Fe$_2$O$_3$ containing Co and the thickness thereof was 0.03 μm, the diameter was 0.25 μm and the plate ratio was 8. In addition, the coercive force Hc thereof was 630 Oe, saturation magnetization σs was 72 emu/g, the easy axis of magnetization was in direction of plane of hexagonal plate-like. Also, the content of Co was 4%.

Next, a magnetic paint was prepared using this magnetic powder 246 part by weight, vinyl chloride resin 19 part by weight, polyurethane resin 28 part by weight, polyisocyanate 7 part by weight, alumina of particle diameter 0.15 μm 30 part by weight, fatty ester 8 part by weight, toluene 298 part by weight, methyl ethyl ketone 298 part by weight and cyclohexanone 66 part by weight.

Then, this magnetic paint was coated on a PET film of 14.5 μm thickness by direct gravure method to be 4.5 μm thickness after being dryed, thus a magnetic layer was formed.

After this process, the film was cut ½ inch width to obtain a magnetic tape for VTR.

[Example-14]

By the same way as Example-13 except for the temperature 150° C. at re-oxidizing, a hexagonal plate-like magnetic powder of γ-FeO$_x$ containing Co (x=1.45, thickness: 0.02 μm, diameter: 0.2 μm, plate ratio: 10, coercive force Hc: 740 Oe, saturation magnetization σs: 80 emu/g, content of Co: 5%) was obtained.

Using this magnetic powder, a magnetic tape was obtained in the same way as Example-13.

[Example-15]

By the same way as Example-13 except for the temperature 80° C. at re-oxidizing, a hexagonal plate-like magnetic powder of γ-FeO$_x$ containing Co (x=1.33, thickness: 0.015 μm, diameter: 0.15 μm, plate ratio: 10, coercive force Hc: 820 Oe, saturation magnetization σs: 85 emu/g, content of Co: 6%) was obtained.

Using this magnetic powder, a magnetic tape was obtained in the same way as Example-13.

[Comparison-6]

By the same way as Example-13 except for using γ-Fe$_2$O$_3$ containing Co (length of major axis: 0.26 μm, needle ratio: 8, coercive force Hc: 640 Oe, saturation magnetization σs: 78 emu/g) instead of the magnetic powder in Example-13, a magnetic tape was obtained.

[Comparison-7]

By the same way as Example-13 except for using hexagonal plate-like barium ferrite magnetic powder (diameter: 0.15 μm, plate ratio: 7, coercive force Hc: 690 Oe, saturation magnetization σs: 51 emu/g) instead of the magnetic powder in Example-13, a magnetic tape was obtained.

[Characteristics]

Magnetic characteristics and electromagnetic conversion characteristics of magnetic tapes obtained in the above examples and comparisons were examined. The results are shown in the following Table-3.

Where, Y-S/N and C-S/N were measured using a noise meter made by remodeling a VHS type video cassette recorder on the market (The tape in Comparison-6 was referenced. The relative value is shown in dB unit). Additionally, magnetic characteristics (Hc, Br) was measured by VSM. Head abrasion was measured by a microscope and expressed by abrasion quantity on tip of ferrite head.

TABLE 3

|      | Hc  | Bs   | Y-S/N | C-S/N(dB) |      | Head abrasion |
|------|-----|------|-------|-----------|------|---------------|
|      | Oe  | G    | dB    | AM        | PM   | μm            |
| E-13 | 720 | 1800 | +1.0  | +0.5      | +0.6 | 1.8           |
| E-14 | 790 | 1900 | +1.4  | +0.8      | +1.4 | 1.3           |
| E-15 | 940 | 2050 | +2.1  | +2.0      | +2.8 | 1.2           |
| C-6  | 760 | 1800 | 0     | 0         | 0    | 0.8           |
| C-7  | 890 | 1600 | −1.9  | −4.5      | −3.8 | 0.1           |

Where, E expresses Example and C expresses Comparison.

By this examination, it is found that the magnetic recording medium by the present invention made of a plate-like oxide magnetic powder containing Co of which easy axis of magnetization exists in a plate-like plane is excellent in electromagnetic conversion characteristics and the head abrasion quantity is in the proper range.

What is claimed is:

1. A magnetic recording medium comprising a substrate and a first magnetic layer on said substrate, wherein said first magnetic layer includes a binder and plate-like metallic magnetic powder of which the easy axis of magnetization exists in the plane of the plate-like particles of said powder.

2. The magnetic recording medium of claim 1, wherein said first magnetic layer further includes a binder resin.

3. The magnetic recording medium of claim 1, wherein said metallic magnetic powder has a thickness from 0.001 to 0.1 μm, a diameter from 0.03 to 0.5 μm, and a diameter/thickness from 3 to 20.

4. The magnetic recording medium of claim 1, wherein said metallic magnetic powder has a coercive force from 800 to 1900 Oe and a saturation magnetization of 110 to 160 emu/g.

5. The magnetic recording medium of claim 1, wherein said metallic magnetic powder comprises hexagonal plate-like iron.

6. The magnetic recording medium of claim 1, wherein said metallic magnetic powder is a magnetic powder obtained by baking and reducing hexagonal plate-like δ-FeOOH.

7. The magnetic recording medium of claim 1, wherein said metallic magnetic powder is a magnetic powder obtained by baking and reducing hexagonal plate-like δ-FeOOH with a sintering preventive agent.

8. The magnetic recording medium of claim 7, wherein said sintering preventive agent is an oxide of an element selected from a group of Si, Al, Cr, Ru, Ca, Zr, P, Mo, Ti, and Mn.

9. The magnetic recording medium of claim 1, wherein said metallic magnetic powder is a magnetic powder obtained by reducing hexagonal plate-like magnetic powder of ferrite.

10. The magnetic recording medium of claim 1, wherein said metallic magnetic powder is a magnetic powder obtained by reducing hexagonal plate-like magnetic powder of ferrite with a sintering preventive agent.

11. The magnetic recording medium of claim 9, wherein said hexagonal plate-like magnetic powder of ferrite is BaO.6Fe$_2$O$_3$, wherein in said ferrite, Ba and Fe are optionally replaced, in part, with other metals.

12. The magnetic recording medium of claim 10, wherein said hexagonal plate-like magnetic powder of ferrite is BaO.6Fe$_2$O$_3$, wherein in said ferrite, Ba and Fe are optionally replaced, in part, with other metals.

13. The magnetic recording medium of claim 10, wherein said sintering preventive agent is an oxide of an element selected from a group of Si, Al, Cr, Ru, Ca, Zr, P, Mo, Ti, and Mn.

14. The magnetic recording medium of claim 1, further comprising a second magnetic layer including needle-shaped magnetic powder under said first magnetic layer.

15. The magnetic recording medium of claim 14, wherein the coercive force of said needle-shaped magnetic powder is smaller than that of said plate-like metallic magnetic powder.

16. A magnetic recording medium comprising a substrate and a magnetic layer on said substrate, wherein said magnetic layer includes a binder and plate-like oxide magnetic powder of which the easy axis of magnetization exists in the plane of the plate-like particles of said powder.

17. The magnetic recording medium of claim 16, wherein said oxide magnetic powder has a thickness from 0.001 to 0.1 μm, a diameter from 0.03 to 0.5 μm, and a diameter/thickness from 3 to 20.

18. The magnetic recording medium of claim 16, wherein said oxide magnetic powder has a coercive force from 300 to 550 Oe and a saturation magnetization of 70 to 90 emu/g.

19. The magnetic recording medium of claim 16, wherein said oxide magnetic powder comprises hexagonal plate-like FeO$_x$ wherein $1.3 \leq x \leq 1.5$.

20. The magnetic recording medium of claim 16, wherein said oxide magnetic powder is a magnetic powder obtained by baking, reducing and oxidizing hexagonal plate-like δ-FeOOH.

21. The magnetic recording medium of claim 16, wherein said oxide magnetic powder is a magnetic powder obtained by baking, reducing and oxidizing hexagonal plate-like δ-FeOOH with a sintering preventive agent.

22. The magnetic recording medium of claim 21, wherein said sintering preventive agent is an oxide of an element selected from a group of Si, Al, Cr, Ru, Ca, Zr, P, Mo, Ti, and Mn.

23. A magnetic recording medium comprising a substrate and a magnetic layer on said substrate, wherein said magnetic layer includes a binder and plate-like oxide magnetic powder containing Co of which the easy axis of magnetization exists in the plane of the plate-like particles of said powder.

24. The magnetic recording medium of claim 23, wherein said oxide magnetic powder has a thickness from 0.001 to 0.1 μm, a diameter from 0.03 to 0.5 μm, and a diameter/thickness from 3 to 20.

25. The magnetic recording medium of claim 23, wherein said oxide magnetic powder has a coercive force from 500 to 1000 Oe and a saturation magnetization of 70 to 85 emu/g.

26. The magnetic recording medium of claim 23, wherein said oxide magnetic powder comprises hexagonal plate-like $FeO_x$ containing Co wherein $1.3 \leq x \leq 1.5$.

27. The magnetic recording medium of claim 23, wherein said oxide magnetic powder is a magnetic powder obtained by baking, reducing and oxidizing both of Co or Co salt and hexagonal plate-like $\delta$-FeOOH.

28. The magnetic recording medium of claim 23, wherein said oxide magnetic powder is a magnetic powder obtained by baking, reducing and oxidizing both of Co or Co salt and hexagonal plate-like $\delta$-FeOOH, where at least one of them is provided with a sintering preventive agent.

29. The magnetic recording medium of claim 28, wherein said sintering preventive agent is an oxide of an element selected from a group of Si, Al, Cr, Ru, Ca, Zr, P, Mo, Ti, and Mn.

* * * * *